Jan. 13, 1942.   A. L. VINCZE   2,269,961
LAWN SHEARS
Filed Oct. 12, 1940
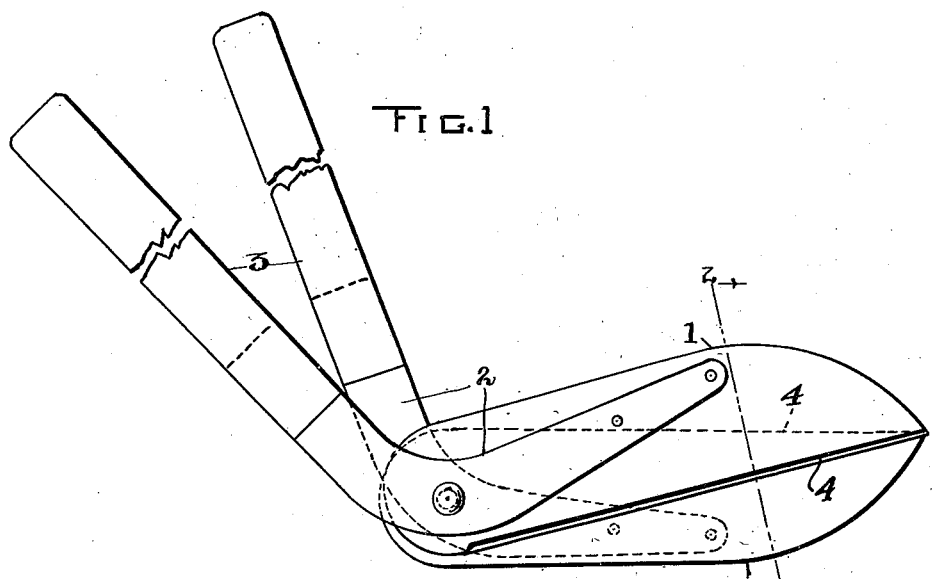
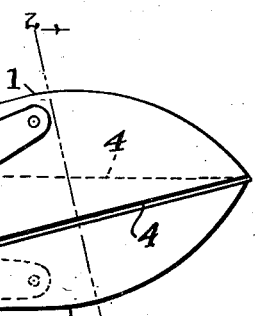
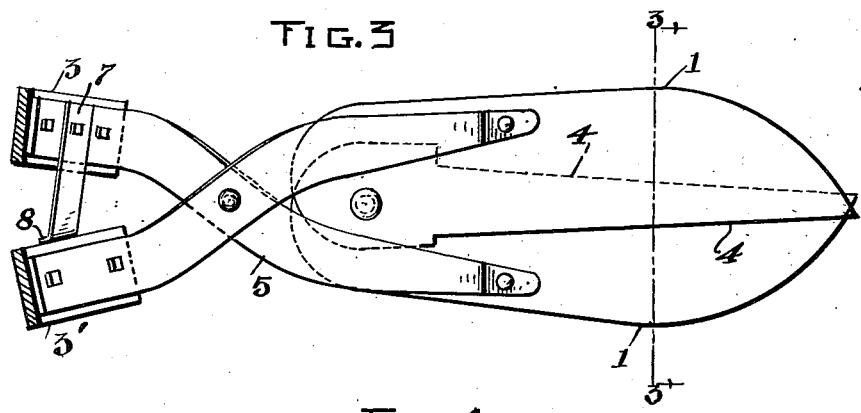
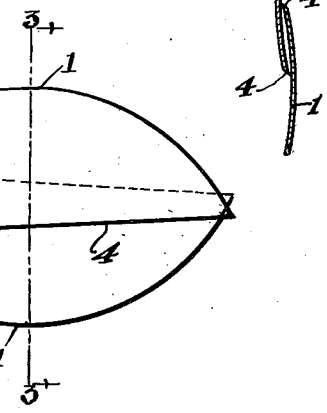
Inventor
ALEXANDER L. VINCZE
By Edward M. Fisher
Attorney Patented Jan. 13, 1942

2,269,961

UNITED STATES PATENT OFFICE 2,269,961

LAWN SHEARS

Alexander L. Vincze, St. Petersburg, Fla.

Application October 12, 1940, Serial No. 360,993

4 Claims. (Cl. 30—257)

This invention is concerned with lawn shears whereby leverage on the cutters is equalized by placing the leverage means ahead of the pivot contact of the cutters.

Another object of my invention is to provide a lawn shear whereby the cutters, thru use, will not become bent and whereby the cutting edges are urged together thereby assuring clean shearing.

This invention resides substantially in the combination, construction, arrangement and relative location of parts, all in accordance with the disclosure herein.

In the accompanying drawing:

Fig. 1 is a side elevation of my invention when adapted for use as a lawn edging shear.

Fig. 2 is a sectional on the line 2—2, Fig. 1.

Fig. 3 is a plan view of my invention when adapted as a lawn trimming shear.

Fig. 4 is a sectional on line 3—3, Fig. 3.

Referring to the drawing, I indicates pivotally connected blades, of substantially uniform thickness, arranged overlapped with respect to each other, and which, as illustrated in Figs. 2 and 4, are of reversely concavo-convexed formation in cross section to prevent bending of the blades and to develope a resilient cutting contact between the, approximately straight, beveled cutting edges 4 extending a major portion of the blades and which confront the concaved side of the opposing blade during the opening and closing movements of the cutters.

Referring to Fig. 1, it will be seen that formed with or connected to the blades are angular shanks 2 which form connecting means between the blades I and the handles 3 and 3', while in Fig. 3 connection between the blades I and the handles 3 and 3' is thru tongs 5, however on reference to the drawing it will be seen that both the shank members 2 and the tongs 5 are angled to and connected with the blades I ahead of the pivot of said blades thereby equalizing leverage upon the blades rather than centralizing the leverage as in similar devices.

When the cutting blades are in pivotal unity with pivotally connected levers for opening and closing the blades a strain is placed upon the resilient blades, at the pivotal contact point, causing a compression as between said blades which maintains same in keen cutting relation.

Referring to Fig. 3 it will be seen that there is a means for limiting the closing movement of the blades, said means comprising an arm 7, bolted to or otherwise engaged with handle member 3, having an angular tip portion 8 at its extreme outer end, whereby as the blades I are closed the closing movement is stopped when the handle member 3', which, as above described is connected to one of the blades, contacts said tip 8.

From the above description it will be apparent to those skilled in the art that the details of construction illustrated herein may readily be varied without departure from the novel subject matter herein disclosed. I do not, therefore, desire to be strictly limited by the disclosure but rather by the claims granted me.

What is claimed is:

1. The combination of coacting concavo-convexed resilient cutting blades, having cutting edges confronting the concaved faces thereof, and pivotally connected levers operating the blades and connected therewith for pivotal unity therebetween.

2. The combination of matched resilient cutters arranged overlapped with respect to each other, of reversely concavo-convexed formation in cross section, and pivotally connected levers operating the cutters and connected therewith for pivotal unity therebetween, whereby, a strain is developed within said pivotal connection causing compression as between said blades and maintaining same in keen cutting relation as to each other.

3. The combination of matched resilient cutters arranged overlapped with respect to each other, of reversely concavo-convexed formation in cross section, and pivotally connected levers operating the cutters and connected therewith for pivotal unity therebetween, whereby, a strain is developed within said pivotal connection causing compression as between said blades and maintaining same in keen cutting relation as to each other, and means for limiting the opening and closing movement of said cutters.

4. The combination of matched resilient cutters, having beveled approximately straight cutting edges extending a major portion of the length of said cutters, arranged overlapped with respect to each other, of concavo-convexed formation in cross section, and pivotally connected levers operating the cutters and connected therewith for pivotal unity therebetween whereby said cutters are maintained in compressed overlapping contact to provide keen cutting relation therebetween.

ALEXANDER L. VINCZE.